United States Patent
Sekiya et al.

(10) Patent No.: US 8,842,646 B2
(45) Date of Patent: Sep. 23, 2014

(54) WIRELESS COMMUNICATION APPARATUS AND METHOD

(75) Inventors: Masahiro Sekiya, Inagi (JP); Koji Horisaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 890 days.

(21) Appl. No.: 12/508,979

(22) Filed: Jul. 24, 2009

(65) Prior Publication Data

US 2010/0034182 A1  Feb. 11, 2010

(30) Foreign Application Priority Data

Aug. 7, 2008 (JP) ................................. 2008-204571

(51) Int. Cl.
*H04W 4/00* (2009.01)
*H04W 28/06* (2009.01)
*H04W 88/02* (2009.01)
*H04L 27/00* (2006.01)
*H04W 28/04* (2009.01)

(52) U.S. Cl.
CPC .............. *H04W 88/02* (2013.01); *H04W 28/06* (2013.01); *H04L 2027/0095* (2013.01); *H04W 28/04* (2013.01)
USPC .......................... 370/338; 370/392; 455/67.11

(58) Field of Classification Search
None
See application file for complete search history.

(56) References Cited

U.S. PATENT DOCUMENTS

| 7,116,942 | B2 | 10/2006 | Hasegawa |
| 2004/0203460 | A1* | 10/2004 | Hasegawa .................. 455/67.13 |
| 2005/0286446 | A1* | 12/2005 | Barber .......................... 370/278 |
| 2007/0189207 | A1* | 8/2007 | Sammour et al. ............. 370/328 |
| 2008/0310572 | A1 | 12/2008 | Futami |

FOREIGN PATENT DOCUMENTS

| JP | 2004-104499 | 4/2004 |
| JP | 2005-252692 | 9/2005 |
| JP | 3715606 | 9/2005 |
| JP | 2006-324891 | 11/2006 |
| JP | 2007-129423 | 5/2007 |
| JP | 2007-158495 | 6/2007 |

OTHER PUBLICATIONS

Office Action issued Nov. 16, 2010, in Japan Patent Application No. 2008-204571 (with English-language Translation).

* cited by examiner

*Primary Examiner* — Ian N Moore
*Assistant Examiner* — Brian T Le
(74) *Attorney, Agent, or Firm* — Oblon, Spivak, McClelland, Maier & Neustadt, L.L.P.

(57) ABSTRACT

When a wireless communication apparatus transmits a data frame requesting an ACK frame, it is expected that a receiver station will transmit the ACK frame. A preamble analyzer analyzes whether or not a preamble pattern added to the header of a received frame exists from the time it is expected that the ACK frame will be received. When a desired preamble pattern is detected, the preamble analyzer supplies instructions to start an operation of demodulating a reception signal to a demodulator via a controller.

19 Claims, 9 Drawing Sheets

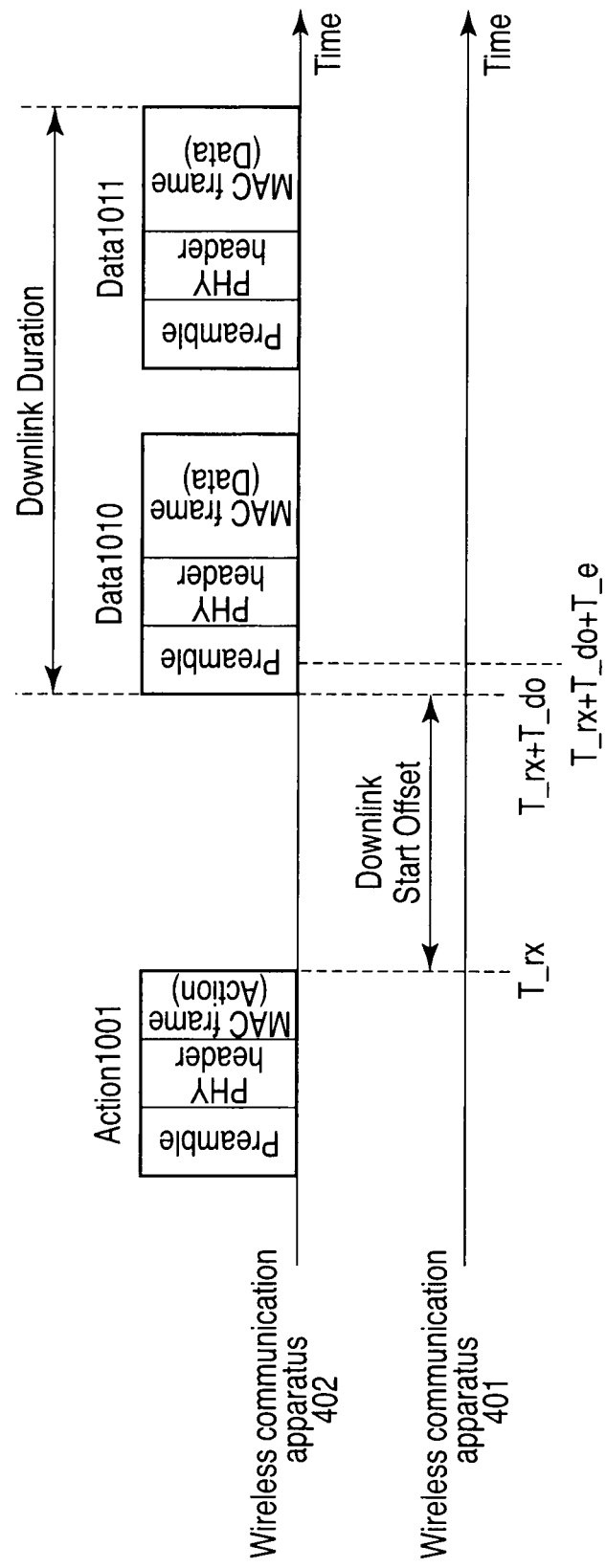
F I G. 10

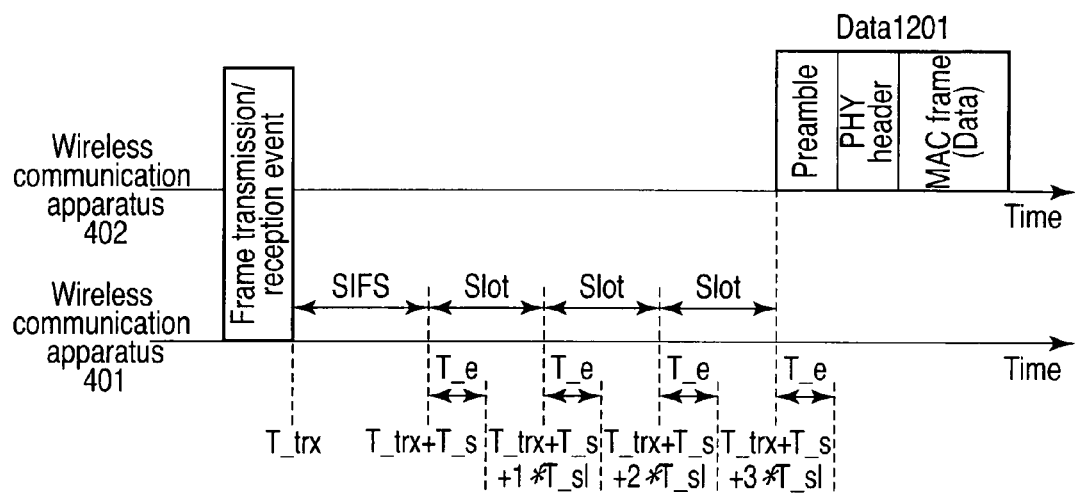
F I G. 12
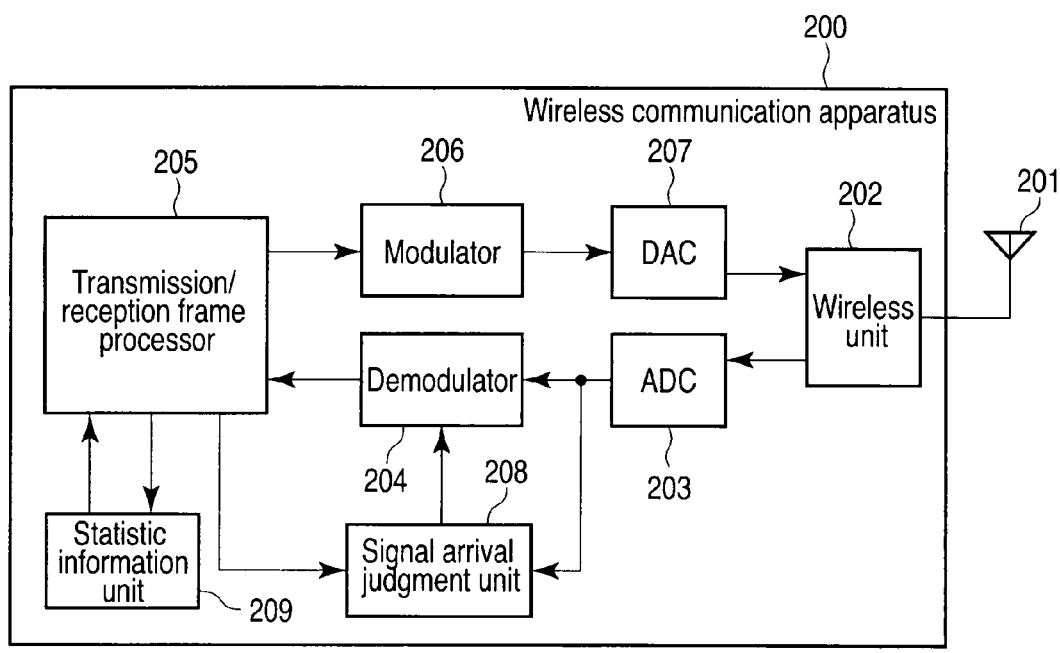
F I G. 13

WIRELESS COMMUNICATION APPARATUS AND METHOD

CROSS-REFERENCE TO RELATED APPLICATIONS

This application is based upon and claims the benefit of priority from prior Japanese Patent Application No. 2008-204571, filed Aug. 7, 2008, the entire contents of which are incorporated herein by reference.

BACKGROUND OF THE INVENTION

1. Field of the Invention

The present invention relates to a wireless communication apparatus and method used for a wireless communication system such as a wireless LAN. In particular, the present invention relates to a method of detecting the header of a frame.

2. Description of the Related Art

According to a wireless LAN system conforming to the IEEE 802.11 standard, a wireless signal is transmitted in a state of being divided into independent frames. A receiver has a need to wait in a receivable state due to frames that may arrive at an unexpected timing. The header of a frame must be detected to receive the frame that has arrived. Conventionally, for example, there has been proposed the following method. According to this method, two average values of signal power at two different durations are determined. Judgment of presence of a header of a frame is determined based on when the difference between two average values exceeds a predetermined reference value. For example, U.S. Pat. No. 7,116,942 discloses the following technique. According to the technique, the header of a received signal is detected using two methods, that is, a change of a power value of a received signal and a change of a correlation value.

A signal received by a wireless communication apparatus is affected by factors such as noise, as well as interference of the desired wave. If the foregoing apparatus receives such an influence when a frame actually arrives, the following error detection occurs. Specifically, the apparatus misses the arrival of the frame, i.e., does not detect it, and reacts to the noise and not the frame; and consequently, starts demodulation. For example, if a reference value for detecting the header of a frame is reduced in order to avoid missing, the possibility of reacting to noise becomes high; as a result, many error detections occur. Conversely, if the reference value is increased to avoid the error detection, there is a high possibility that the header of a frame to be inherently received is not detected; as a result, missing increases. The foregoing missing and error detection are inevitable problems whenever a signal containing noise and an interference signal is received. The foregoing problem is not solved even if the technique disclosed in U.S. Pat. No. 7,116,942 is employed. As described above, conventionally, there is a problem that frame reception is not effectively performed due to missing of a received signal and error detection; therefore, improvement is desired.

BRIEF SUMMARY OF THE INVENTION

According to a first aspect of the present invention, there is provided a wireless communication apparatus comprising:

a signal arrival judgment unit configured to wait for until a first time elapses after a MAC frame is transmitted or received and configured to wait until a second time elapses after the first time elapses, and configured to judge whether or not a desired reception signal arrives until the second time elapses from the first time elapses; and a demodulator configured to receive the judgment result by the signal arrival judgment unit, and configured to start to demodulate the reception signal after the signal arrival judgment unit judges that a desired reception signal arrives.

According to a second aspect of the present invention, there is provided a wireless communication apparatus comprising:

a signal arrival judgment unit configured to wait until a first time elapses after a MAC frame is transmitted or received and configured to repeat an operation of waiting until a second time elapses after the first time elapses by N times (N is an integer number more than 1) at a fixed cycle, and configured to judge whether or not a desired reception signal arrives for a duration until the second time elapses in a state of waiting N-time second time; and a demodulator configured to receive the judgment result by the signal arrival judgment unit, and configured to start to demodulate the reception signal after the signal arrival judgment unit judges that a desired reception signal arrives.

According to a third aspect of the present invention, there is provided a wireless communication method comprising:

transmitting or receiving a MAC frame;

waiting until a first time elapses after the MAC frame is transmitted or received;

waiting until a second time elapses after the first time elapses;

judging whether or not a desired reception signal arrives for a duration until the second time elapses after the first time elapses; and starting a demodulation operation of the reception signal after it is judged that the desired reception signal arrives.

BRIEF DESCRIPTION OF THE SEVERAL VIEWS OF THE DRAWING

FIG. 10 is a view to explain a state that a MAC frame is exchanged between the wireless communication apparatuses according to a fifth embodiment;

FIG. 12 is a view to explain a state that a MAC frame is exchanged between the wireless communication apparatuses according to a sixth embodiment; and FIG. 13 is a block diagram showing the configuration of a wireless communication apparatus according to a seventh embodiment.

DETAILED DESCRIPTION OF THE INVENTION (Configuration of MAC Frame)

A MAC frame used for wireless communication apparatuses according to various embodiments of the present invention will be explained below before the description of embodiments of the present invention.

Figure 1:
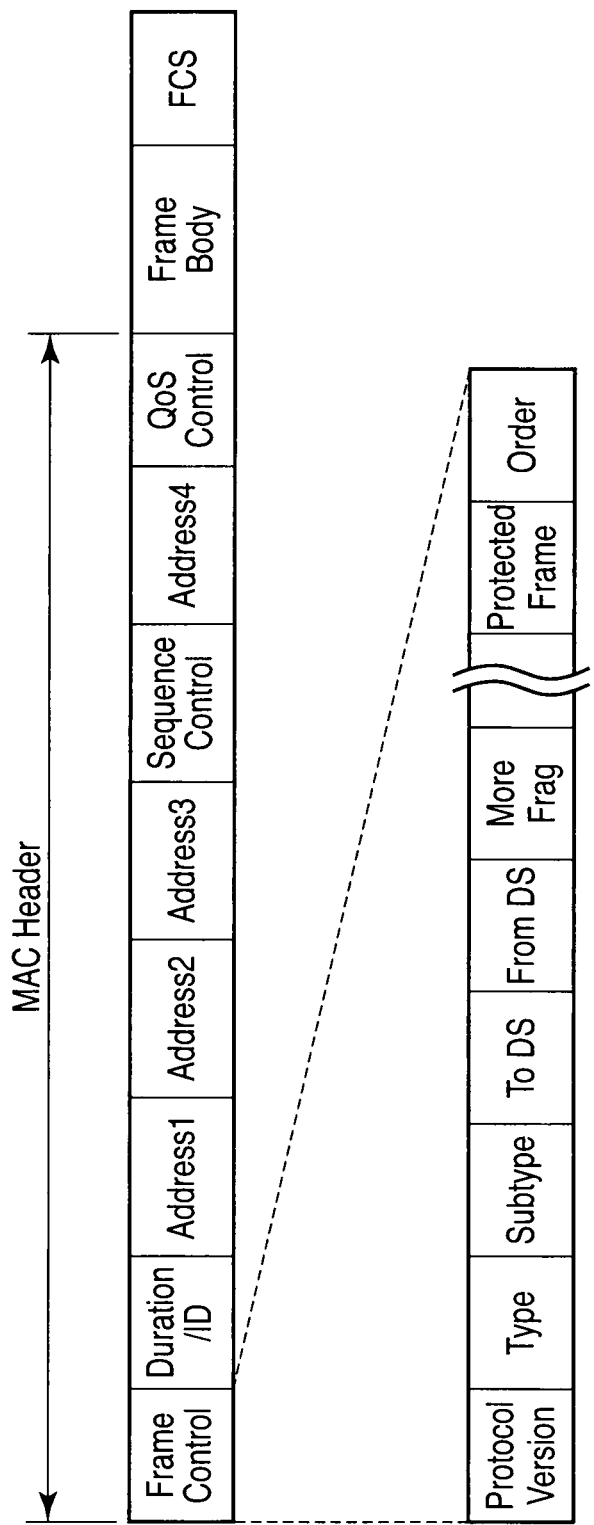
FIG. 1 is a view showing a MAC frame conforming to the IEEE 802.11 standard.

FIG. 1 shows the configuration of a MAC frame used for a wireless LAN system conforming to the IEEE 802.11 standard. A MAC frame is composed of a MAC header, a frame body and a frame check sequence (FCS). Specifically, the MAC frame sets information required for reception processing in a MAC layer. The frame body is stored with information (data from upper layer) corresponding to the kind of a frame. The frame check sequence (FCS) is stored with a cyclic redundancy code (CRC) used for judging whether or not the MAC header and the frame body are normally received.

The MAC header includes the following various fields. One is a frame control field, which is stored with a value corresponding to the kind of a frame. Another is a duration/ID field showing a transmission waiting duration (NAV: Network Allocation Vector). Another is a plurality of address fields, which set direct destination, the final destination and sender MAC address. Another is a sequence control field, which sets a transmission data sequence number and a fragment number when data is fragmented. The frame control field includes a type field showing the kind of frame, a subtype field, a "To DS" field, a "From DS" field, a more fragment field, a protected frame field and an order field.

It is recognized that a frame belong to which frame type of a control frame, a management frame and a data frame according to a bit string stored in the type field. The kind of a MAC frame in each frame type is shown according to a bit string of the subtype field. The "To DS" field is stored with information of whether a reception station is a wireless base station or a wireless terminal. The more fragment field holds information showing whether or not a following fragment frame exists when data is fragmented. The protected frame field is stored with information of whether or not the frame is protected. The order field is stored with information that the frame order is not rearranged when a frame is relayed.

When a frame is a QoS data frame, a QoS control field is added to the MAC header. When the frame is a non-QoS Data frame, the QoS control field is not added. If the frame is a QoS data frame, it is recognized that the frame is a data frame according to the type field of the frame. In this case, a bit string stored in the subtype field is confirmed, and thereby, it is possible to recognize whether the data is QoS data or Non-QoS data. The QoS control field includes a TID field (16 kinds from 0 to 15) and an Ack policy field. The TID field is stored with an identifier corresponding to data traffic. The Ack policy field is stored with a transmission acknowledgment policy. The TID field is confirmed, and thereby, the kind of the data traffic is recognized. The Ack policy field is confirmed, and thereby, it is possible to judge whether the QoS data is transmitted using a normal Ack policy, a block Ack policy or a no-Ack policy.

Various embodiment of the present invention will be described below. Wireless communication apparatuses according to various embodiments of the present invention form a wireless LAN system. The wireless LAN system forms the following networks. One is an infrastructure mode network, which is composed of one wireless base station and one wireless terminal or more. Another is an Ad Hoc mode network in which a communication is performed between wireless terminals without making a connection with a wireless base station. Another is a wireless distribution system (WDS) network, which performs a communication between wireless base stations. The wireless communication apparatus is applicable to both a wireless base station and wireless terminal according to the operation described in the following various embodiments.

(Configuration of Wireless Communication Apparatus)

Figure 2:
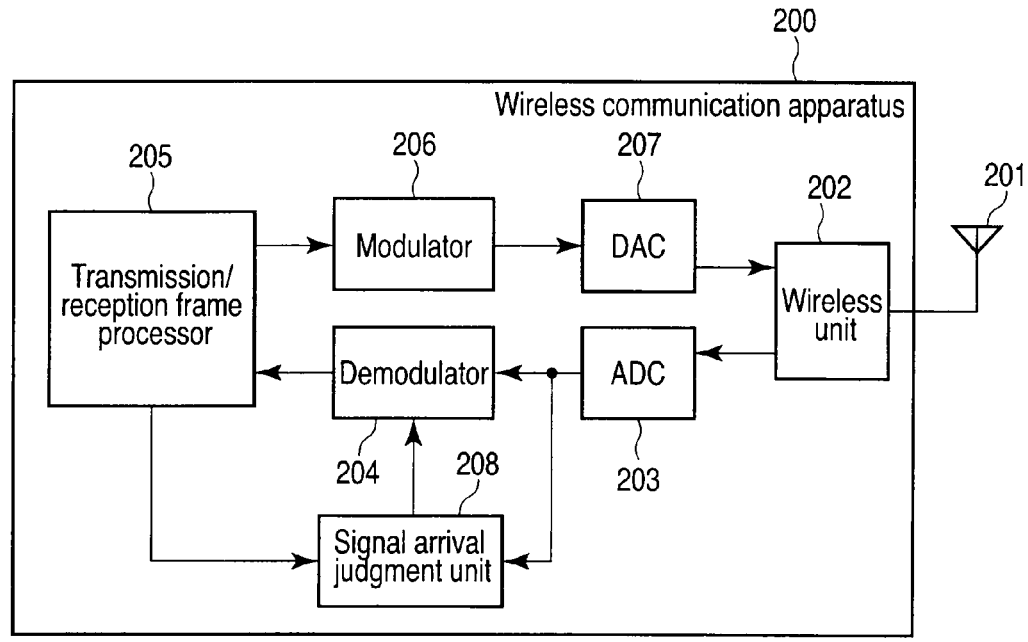
FIG. 2 is a block diagram showing the configuration of a wireless communication apparatus according to first to sixth embodiments.

FIG. 2 is a block diagram showing the configuration of a wireless communication apparatus according to various embodiments of the present invention. For example, a wireless communication apparatus 200 is an apparatus conforming to the IEEE 802.11 (including IEEE 802.11a, IEEE 802.b, IEEE 802.11g, IEEE 802.11n, and so forth). An antenna 201 receives an analog wireless signal transmitted in 2.4 GHz and 5 GHz bands. The signal received by the antenna 201 is converted to a proper frequency-band signal by a wireless unit 202. Thereafter, the signal is converted to a digital signal by an analog-to-digital converter (ADC) 203, and then, supplied to a demodulator 204. The demodulator 204 performs a reception processing including predetermined demodulation and decoding conforming to the IEEE 802.11 standard so that the foregoing signal is converted to a MAC frame conforming to the IEEE 802.11 standard. Then, the demodulator 204 transfers the MAC frame to a transmission/reception frame processor 205.

According to such transmission, the transmission/reception frame processor 205 generates a MAC frame (e.g., data frame, control frame such as ACK and CTS), and thereafter, transfers it to a modulator 206. For example, the modulator 206 performs a transmission processing including predetermined modulation and coding conforming to the IEEE 802.11 standard. Thereafter, a digital-to-analog converter (DAC) 207 converts the MAC frame from a digital signal to an analog base-band signal, and then, the base-band signal is supplied to the wireless unit 202. The wireless unit 202 up-converts the base-band signal to a predetermined frequency band (e.g., 2.4 GHz and 5 GHz bands), and thereafter, transmits the signal from the antenna 201.

When the demodulator 204 demodulates the signal received by the wireless communication apparatus 200, frame arrival is first detected. A signal arrival judgment unit 208 detects the signal arrival.

Figure 3:
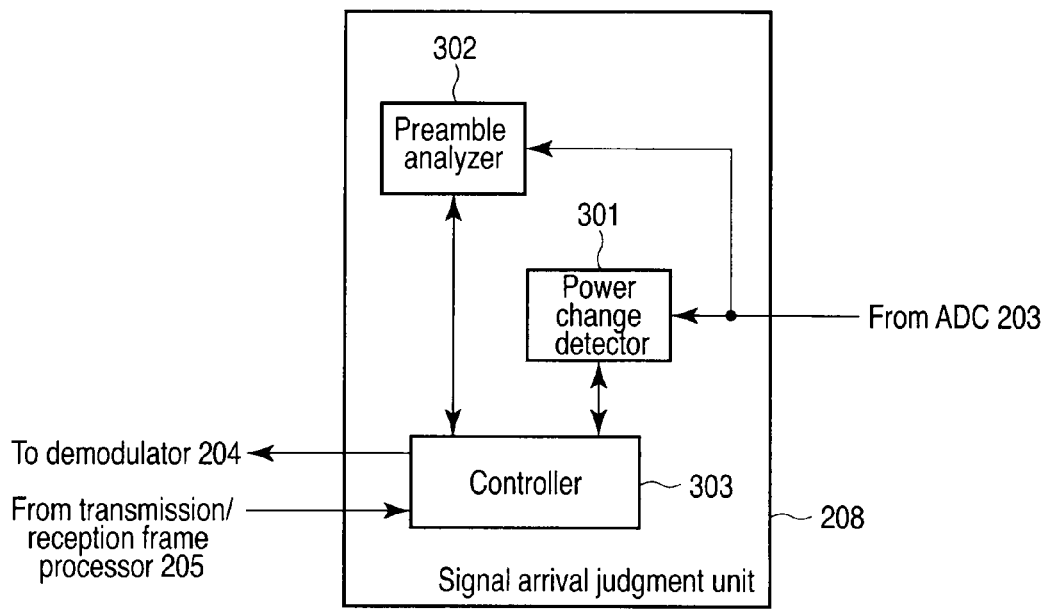
FIG. 3 is a block diagram schematically showing the function of a signal arrival judgment unit of the wireless communication apparatus shown in FIG. 2.

FIG. 3 is a block diagram schematically showing the function included in the signal arrival judgment unit 208 shown in FIG. 2. The digital signal from the ADC 203 is supplied to a power change detector 301 and a preamble analyzer 302. A controller 303 performs control for operating the foregoing power change detector 301 and preamble analyzer 302 at a desired timing. For example, if the power change detector 301 detects a power change of the received signal, the controller 303 supplies instructions to start an operation to the preamble analyzer 302. The preamble analyzer 302 receiving the operation start instruction analyzes whether or not a desired preamble pattern exists in the received signal. If the desired preamble pattern is detected, the preamble analyzer 302 supplies instructions to modulate the received signal to the demodulator 204 via the controller 303.

The controller 303 receiving the operation start instruction from the transmission/reception frame processor 205 supplies instructions to start an operation for analyzing whether or not a desired preamble pattern exists in the received signal, to the preamble analyzer 302. The preamble analyzer 302 receiving the operation start instruction analyzes whether or not the desired preamble pattern exists in the received signal. If the desired preamble pattern is detected, the preamble analyzer 302 supplies an instruction to start an operation for demodulating the received signal, to the demodulator 204 via the controller 303.

The processing described in this embodiment may be realized as an analog or digital circuit, or may be realized by software executed by a CPU.

Figure 4:
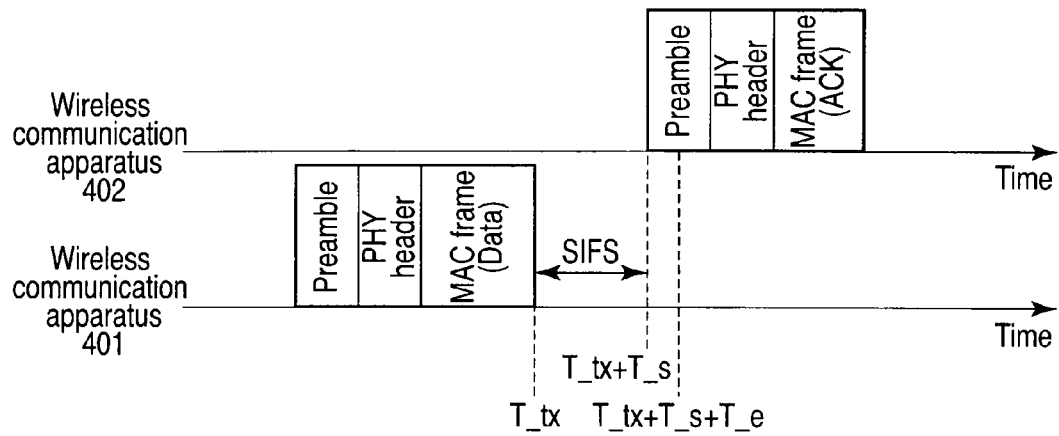
FIG. 4 is a view to explain a state that a MAC frame is exchanged between the wireless communication apparatuses according to a first embodiment.

The first embodiment of the present invention relates to a frame sequence in the following case. Namely, as shown in FIG. 4, a wireless communication apparatus 401 transmits a data frame requesting an ACK frame to a wireless communication apparatus 402. Then, the wireless communication apparatus 401 receives an ACK frame returned from the wireless communication apparatus 402.

(Signal Arrival Judgment Operation)

Figure 5:
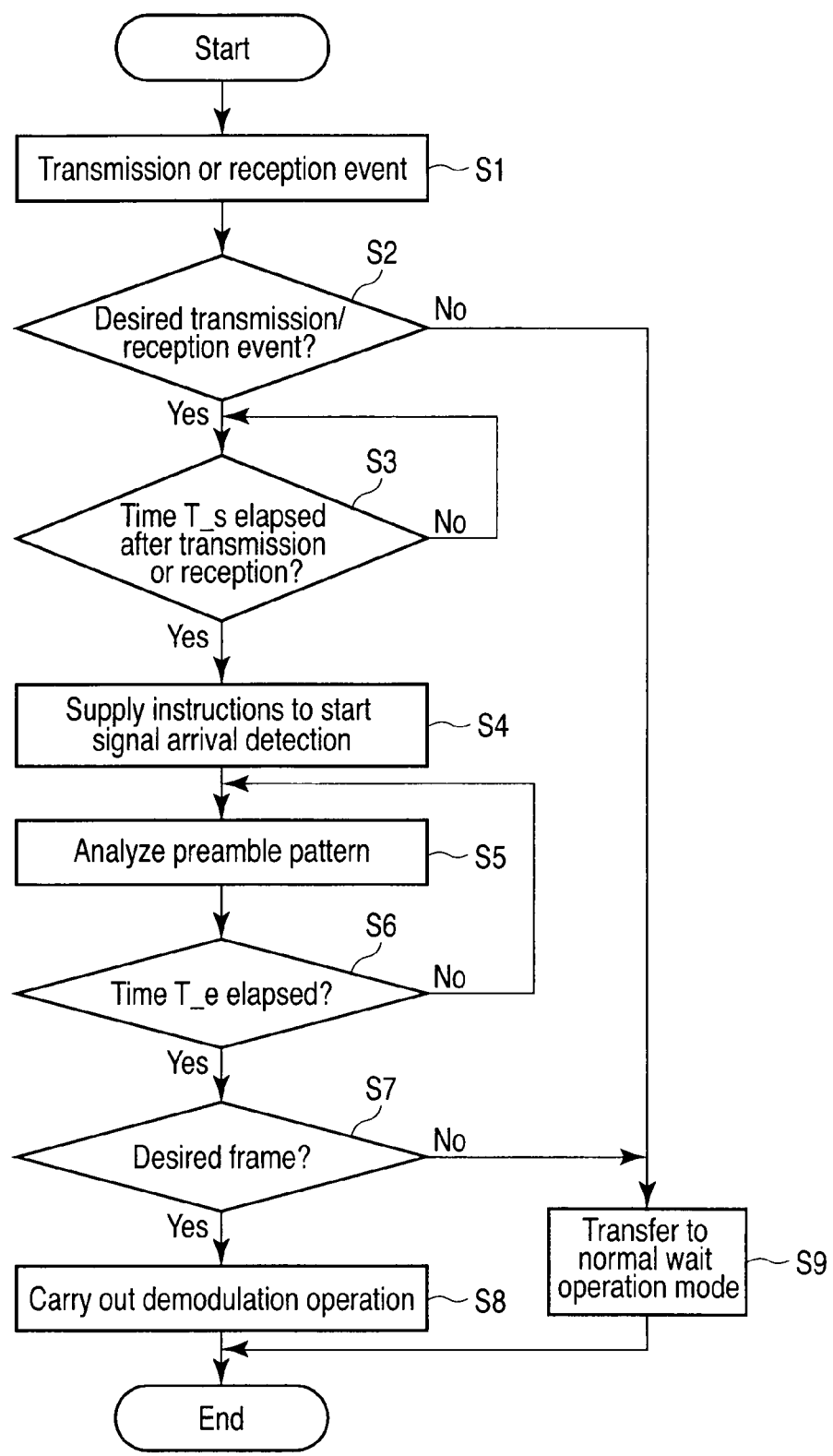
FIG. 5 is a flowchart to explain a first embodiment.

The signal arrival judgment operation performed by the wireless communication apparatus of this embodiment will be hereinafter described with reference to a frame sequence chart of FIG. 4 and a flowchart of FIG. 5.

Wireless communication apparatuses 401 and 402 have the configuration shown in FIG. 2. The transmission/reception frame processor 205 analyzes the transmission or reception operation timing and the kind of a MAC frame in transmission or reception (step S1). If a transmission or reception event occurs, the processor 205 judges whether or not a transmitted or received frame is a frame, which is a factor of starting the signal arrival judgment operation (step S2).

According to the frame sequence described in this embodiment, the case where the wireless communication apparatus 401 transmits a data frame requesting an ACK frame is assumed. In this case, frame transmission by the wireless communication apparatus 401 is a transmission operation, which is a factor of starting the signal arrival judgment operation.

In step S2, if it is judged that the frame transmission is a factor of starting the signal arrival judgment operation (Yes), the wireless communication apparatus 401 waits. Specifically, the apparatus 401 waits until time T_s (first time) from time (T_tx) when a data frame is transmitted elapses (step S3), as seen from FIG. 4. According to the first embodiment, the time T_s is a time until ACK is returned after data transmission, that is, prescribed as short interframe space (SIFS) according to the IEEE 802.11 standard. The time T_s is 16 μs according to the IEEE 802.11a standard, and is 10 μs according to the IEEE 802.11b and 802.11g standards. In this case, a MAC header of the data frame is confirmed to ascertain whether or not the transmitted data frame requests an ACK frame. If the type field of the MAC header shows a data type and the subtype field shows a non-QoS data subtype, the ACK frame is requested. If the type field shows a data type and the subtype shows a QoS data subtype, the MAC frame is a QoS data frame. When the MAC frame is a QoS data frame, the Ack policy field of the QoS control field of the MAC header is confirmed. When the Ack policy field shows a normal Ack policy, ACK is requested.

After the time T_s elapses, the transmission/reception frame processor 205 supplies signal arrival judgment operation start instructions to the signal arrival judgment unit 208 (step S4). Then, the controller 303 of the signal arrival judgment processor 208 receives the foregoing operation start instructions. In this case, the controller 303 supplies instructions to make correlation between the received signal and a known preamble pattern, to the preamble analyzer 302 (step S5). In a wireless LAN conforming to the IEEE 802.11 standard, a frame transmitted to a wireless medium is composed of Preamble, PHY header and MAC frame (ACK) like the ACK frame of the frame sequence show in FIG. 4. As seen from FIG. 4, the header of a wireless signal (ACK frame) is added with a Preamble. The Preamble has a fixed cycle, and has a format such that a predetermined number of known patterns are combined in transmitter and receiver wireless communication apparatuses. The PHY header is stored with parameters such as modulation method, coding rate and MAC frame length required for demodulating the MAC frame according to a known format. The MAC frame is configured in a state that a MAC frame transferred from a MAC layer (corresponding to transmission/reception frame processor 205 of FIG. 2) to a PHY layer (corresponding to ADC 203, demodulator 204, modulator 206 and DAC 207) is modulated according to the IEEE 802.11 standard.

As described above, when the received signal is a frame conforming to the IEEE 802.11 standard, the known Preamble pattern is repeated a predetermined number of times at a fixed cycle. For this reason, correlation is made between the received signal and the known Preamble pattern by a certain time (T_e) (step S6).

After the time T_e elapses, it is determined whether or not the received signal is a desired frame (step S7). In this case, if the preamble analyzer 302 judges that the received signal is a desired frame (Yes), the analyzer 302 notifies the foregoing information to the controller 303. The controller 303 receiving the foregoing notification supplies instructions to start an operation for demodulating the received signal, to the demodulator 204 (step S8).

Conversely, if the preamble analyzer 302 judges that the received signal is not a desired frame (No), the wireless communication apparatus transfers to a normal wait operation mode (step S9). The foregoing normal wait operation mode means the following mode. For example, according to the normal wait operation mode, two average values of signal power of two different durations are determined. Then, the power change detector 301 monitors whether or not the difference between two average values exceeds a predetermined reference value.

As described above, when the wireless communication apparatus 401 transmits a data frame requesting an ACK frame, it is expected that a receiver station (wireless communication apparatus 402) will transmit the ACK frame after SIFS. For this reason, the following processing is started instead of a usual method of detecting a power change. According to the processing, correspondence of the known pattern added to the header of the received frame is detected from the time it is expected that the ACK frame will be received. In this way, it is possible to avoid the following disadvantages. Specifically, the received frame is missed because a power change generated when a desired frame is received is not detected. A frame is detected as a received frame in error due to a power change such as noise.

Conventionally, a desired frame is missed without being detected, or an undesired wireless signal is detected in error as a frame to be received; therefore, reception processing is not effectively performed. On the contrary, according to this embodiment, a reception processing is started from the time it is expected that a desired frame will be received, and thereby, reception performance is improved.

Second Embodiment

The second embodiment relates to a frame sequence in the case where a wireless communication apparatus 401 receives a data frame having no request to return an ACK frame from a wireless communication apparatus 402.

Figure 6:
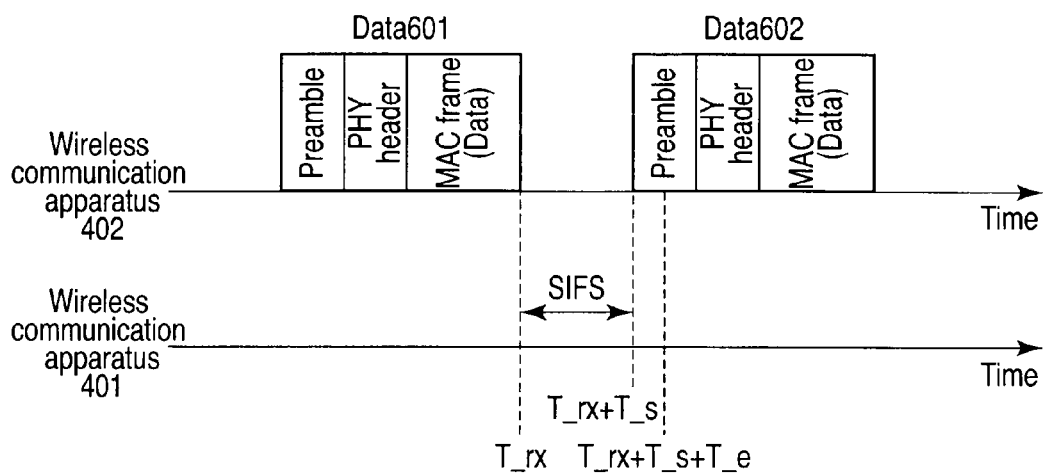
FIG. 6 is a view to explain a state that a MAC frame is exchanged between the wireless communication apparatuses according to a second embodiment.

As seen from FIG. 6, a data frame is transmitted at SIFS intervals as one of a frame sequence conforming to the IEEE 802.11 wireless LAN standard. FIG. 6 shows the case where the wireless communication apparatus 402 transmits data 601, and then, transmits data 602 after SIFS. The data frame transmitted at SIFS intervals is limited to two; in this case, three data frames or more may be transmitted.

In FIG. 6, when receiving data 601, the wireless communication apparatus 401 judges whether or not the received data 601 is a frame, which is a factor of starting a signal arrival judgment operation. According to the frame sequence, the wireless communication apparatus 401 judges that a data frame having no request of an ACK frame is received. The foregoing data 601 is received, and thereby, the wireless communication apparatus 401 expects that a data frame will be transmitted after SIFS. Therefore, reception of the data 601 is a reception operation, which is a factor of starting a signal arrival judgment operation.

The wireless communication apparatus 401 receives the data 601, and thereafter, waits until time T_s (first time) from time (T_rx) receiving the data 601 elapses. The following two methods are employed as a method of detecting the header when the wireless communication apparatus 401 receives the data 601 like the conventional case. For example, one is a method of determining two average values of signal power at two different durations, and judging the time difference between two average values exceeds a predetermined reference value as a rise. The other is a change of the received signal power value and a change in a correlation value. In this case, a MAC header of the data frame is confirmed to ascertain that the data frame transmitted by the wireless communication apparatus 402 has no request of an ACK frame. If the type field of the MAC header shows a data type and the subtype shows a QoS data subtype, the MAC frame is a QoS data frame. When the MAC frame is a QoS data frame, the Ack policy field of the QoS control field of the MAC header is confirmed. When the Ack policy field is set to a no-Ack policy, the ACK frame is not requested.

Reception processing after time T_s elapses is the same as the case of the first embodiment; therefore, the explanation is omitted.

The wireless communication apparatus of the second embodiment can obtain the same effect as the wireless communication apparatus of the first embodiment.

Third Embodiment

The third embodiment relates to a frame sequence in the case where a wireless communication apparatus 401 receives a data frame requesting an ACK frame from a wireless communication apparatus 402.

Figure 7:
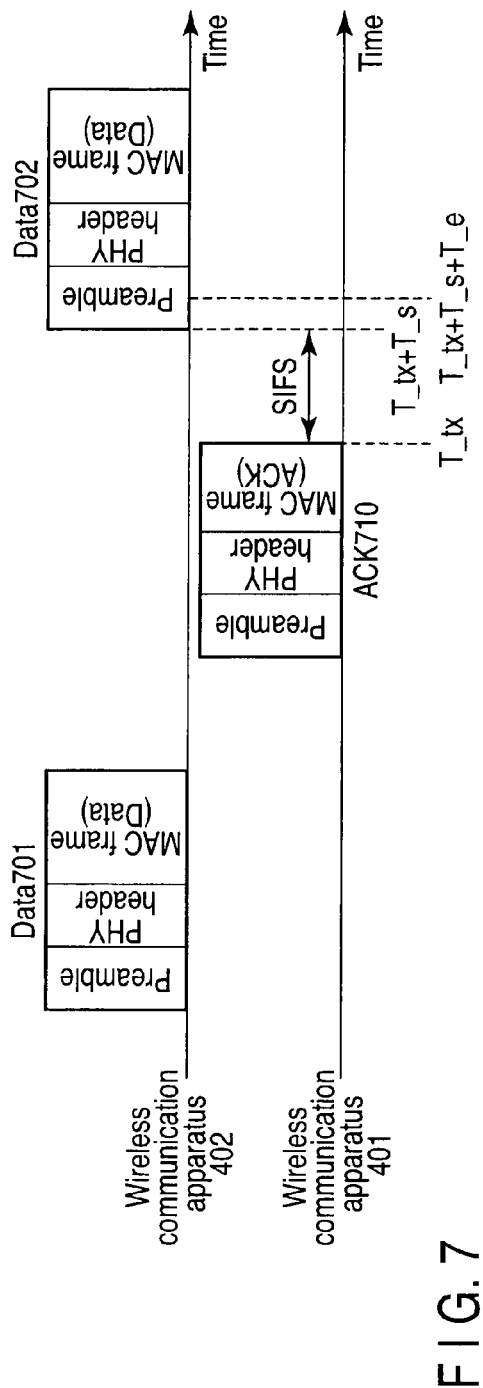
FIG. 7 is a view to explain a state that a MAC frame is exchanged between the wireless communication apparatuses according to a third embodiment.

As seen from FIG. 7, an exchange of a data frame and an ACK frame is made at SIFS intervals as one of a frame sequence conforming to the IEEE 802.11 wireless LAN standard. FIG. 7 shows the case where a wireless communication apparatus 402 transmits data 701, and a wireless communication apparatus 401 transmits ACK 710 after SIFS, and further, the apparatus 402 transmits data 702. In this case, the data 702 transmitted after SIFS of the ACK 710 may be a data frame requesting an ACK frame or a data frame requesting no ACK frame. Data transmission at SIFS intervals may be performed three times or more.

In FIG. 7, when receiving data 701, the wireless communication apparatus 401 judges whether or not the received data 701 is a frame, which is a factor of starting a signal arrival judgment operation. According to the frame sequence, the wireless communication apparatus 401 judges that a data frame requesting an ACK frame is received. Therefore, data 701 is received, and thereby, the wireless communication apparatus 401 transmits the ACK 710 after SIFS. The SIFS time elapses after transmission, and thereafter, the apparatus 401 expects that a data frame will be further transmitted. Therefore, transmission of the ACK 710 is a transmission operation, which is a factor of starting a signal arrival judgment operation.

The wireless communication apparatus 401 receives data 701 and transmits ACK 710, and thereafter, waits until time T_s (first time) from time (T_tx) ACK 710 is transmitted elapses. In this case, a MAC header of the data frame is confirmed to ascertain that a transmitting data frame is a frame requesting an ACK frame. The method of confirming the foregoing matter is as described in the first embodiment.

Reception processing after time T_s elapses is the same as the case of the first embodiment; therefore, the explanation is omitted.

The wireless communication apparatus of the third embodiment can obtain the same effect as the wireless communication apparatus of the first embodiment.

Fourth Embodiment

The fourth embodiment relates to a frame sequence in the following case. According to the case, a wireless communication apparatus 401 transmits a frame giving a frame transmission right to a wireless communication apparatus 402. Thereafter, the wireless communication apparatus 401 receives a data frame from the wireless communication apparatus 402.

Figure 8:
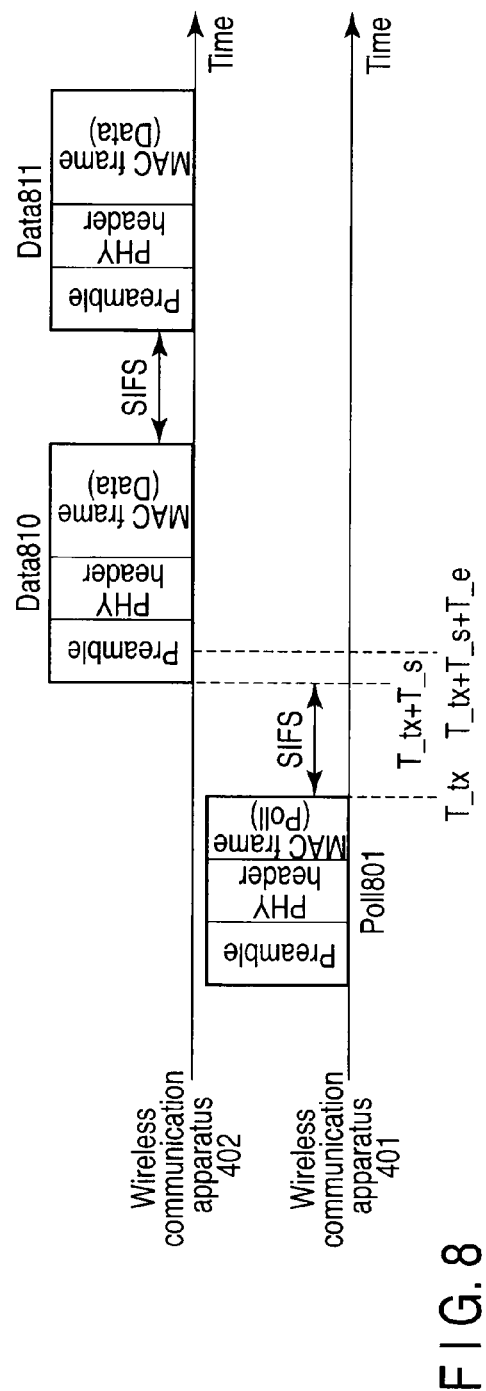
FIG. 8 is a view to explain a state that a MAC frame is exchanged between the wireless communication apparatuses according to a fourth embodiment.

As shown in FIG. 8, the following sequence is given as one of a frame sequence conforming to the IEEE 802.11 wireless LAN standard. According to the sequence, the wireless communication apparatus 401 transmits a frame (e.g., QoS CF-Poll frame) giving a frame transmission right to the wireless communication apparatus 402. In this way, the wireless communication apparatus 402 receiving a QoS CF-Poll frame can transmit a frame (e.g., data frame) for a fixed time (e.g., 2 msec).

FIG. 8 shows the case where the wireless communication apparatus 401 transmits Poll 801 (i.e., QoS CF-Poll frame), and the wireless communication apparatus 402 obtaining transmission right by receiving the Poll 801 transmits data 810 and 811 after SIFS. In this case, after SIFS receiving Poll 810, the wireless communication apparatus 402 may transmit data three times or more. The foregoing data may be a frame requesting ACK or may be a frame requesting no ACK.

In FIG. 8, when transmitting Poll 801, the wireless communication apparatus 401 judges whether or not the transmitted Poll 801 is a frame, which is a factor of starting a signal arrival judgment operation. According to the frame sequence, the wireless communication apparatus 401 judges that a frame giving transmission right to the wireless communication apparatus 402 is transmitted. Therefore, Poll 801 is transmitted, and thereby, the wireless communication apparatus 401 expects that a data frame will be transmitted after SIFS. Consequently, transmission of Poll 801 is a transmission operation, which is a factor of starting a signal arrival judgment operation.

The wireless communication apparatus 401 transmits Poll 801, and thereafter, waits until time T_s (first time) from time (T_tx) Poll 801 is transmitted elapses. A MAC header of the frame is confirmed to ascertain that the transmitted frame is a QoS CF-Poll frame.

Reception processing after time T_s elapses is the same as the case of the first embodiment; therefore, the explanation is omitted.

The wireless communication apparatus of the fourth embodiment can obtain the same effect as the wireless communication apparatus of the first embodiment.

Fifth Embodiment

The fifth embodiment relates to a frame sequence in the case where a wireless communication apparatus 402 transmits a frame including timing information for transmitting a Downlink frame to a wireless communication apparatus 401, and transmits a data frame to the apparatus 401 after a fixed time.

The following protocol for transmitting a Downlink frame is given as one of a frame sequence conforming to the IEEE 802.11 wireless LAN standard. Specifically, as seen from FIG. 10, the wireless communication apparatus 402 transmits a frame (e.g., power save multi poll (PSMP) including information showing that a Downlink frame is transmitted after a fixed time elapses. In this case, the wireless communication apparatus 402 transmitted the PSMP frame has a sequence of transmitting a frame (e.g., data frame) within a specified time (e.g., 1 msec) after a fixed time elapses (e.g., 500 μsec).

In FIG. 10, the wireless communication apparatus 402 transmits Action 1001 (i.e., Action frame), and thereby, declares to transmit a data frame for a downlink duration after a time (downlink start offset) set in timing information included in the Action 1001. The wireless communication apparatus 401 receiving the Action 1001 recognizes that data 1010 and 1011 are transmitted from the wireless communication apparatus 402 after a downlink start offset. For example, the Action 1001 has a MAC frame format shown in FIG. 9. Therefore, it is possible to recognize an Action frame from each bit string of a type and subtype of a MAC header shown in FIG. 9.

In the Action frame, a frame body includes category and action fields. According to the foregoing two fields, the features of the action frame, that is, a frame having what information is recognized. For example, if the kind of the MAC frame is an Action frame, when "7" is set to the category field and "2" is set to the action field, it is prescribed that the action frame is a frame including frame transmission timing information. The action frame is prescribed as described above, and thereby, it can be seen from the configuration of a frame body 901 of FIG. 9 that a downlink start offset field and downlink duration is included after the action field.

The action frame is prescribed as described above, and thereby, the wireless communication apparatus 401 receiving the Action 1001 can recognize that timing data 1010 and 1011 are transmitted, and can receive these frames.

In FIG. 10, when receiving Action 1001, the wireless communication apparatus 401 judges whether or not the received Action 1001 is a frame, which is a factor of starting a signal arrival judgment operation. According to the frame sequence, the wireless communication apparatus 401 judges that the received Action 1001 is a frame including frame transmission timing information. Therefore, the Action 1001 is received, and thereby, the wireless communication apparatus 401 recognizes that a data frame is transmitted after downlink start offset included in the frame. Therefore, transmission of Action 1001 is a transmission operation, which is a factor of starting a signal arrival judgment operation.

When receiving Action 1001, the wireless communication apparatus 401 waits until time T_do (first time) prescribed in the downlink start offset field from time (T_rx) of receiving Action 101 elapses, as shown in FIG. 10.

Reception processing after time T_do elapses is the same as reception processing after time T_s elapses in the first embodiment; therefore, the explanation is omitted.

Figure 9:
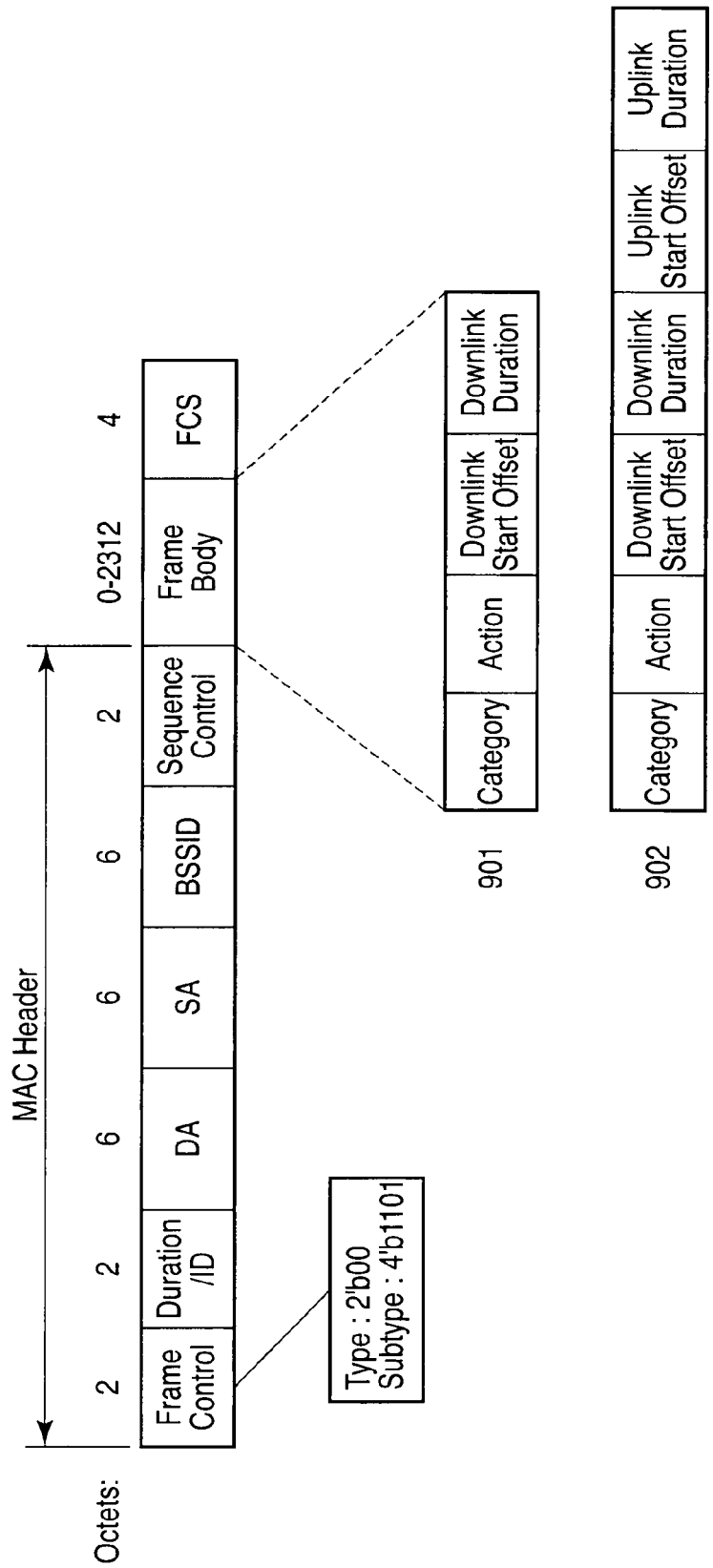
FIG. 9 is a view showing the configuration of an Action frame according to a fifth embodiment.
Figure 11:
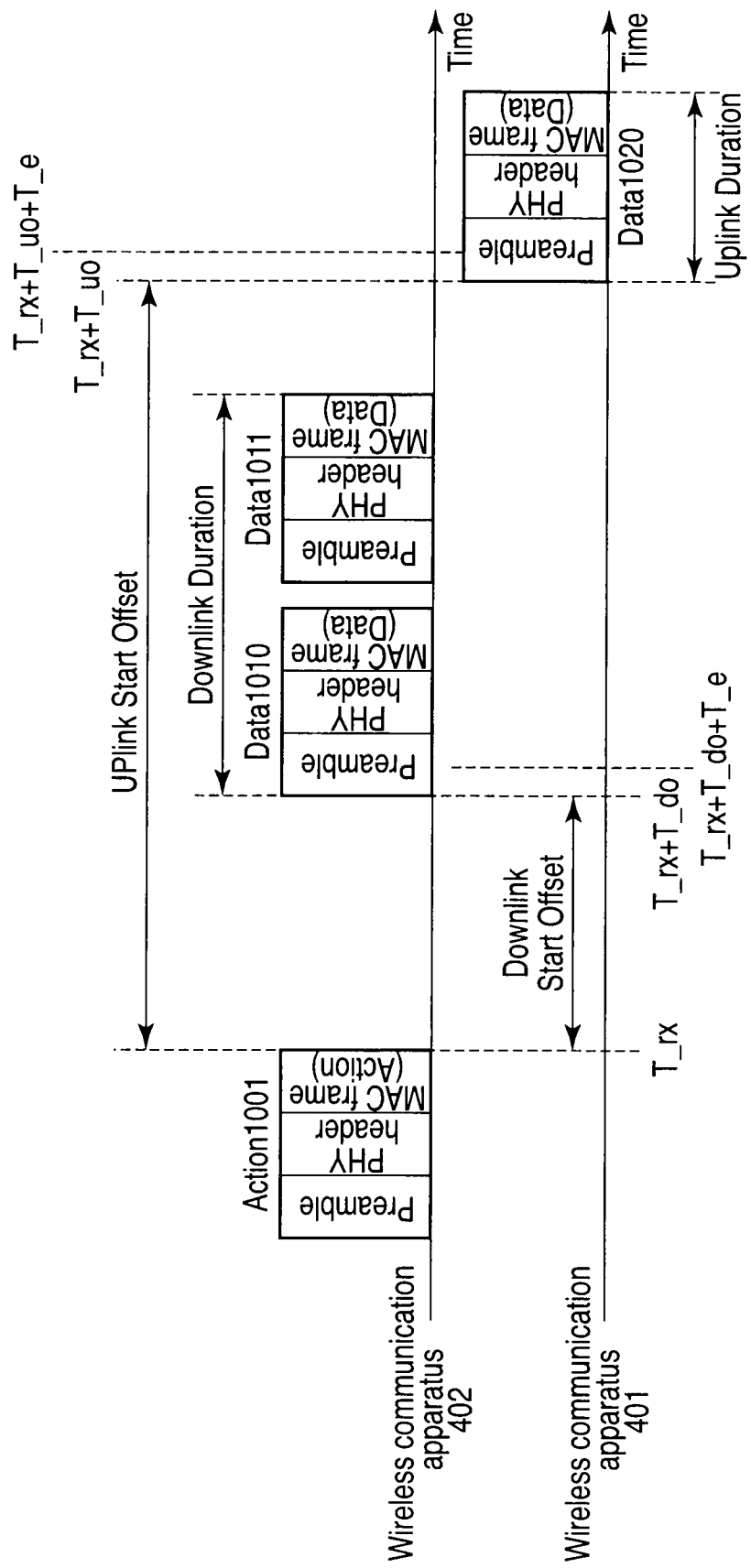
FIG. 11 is a view to explain a state that a MAC frame is exchanged between the wireless communication apparatuses according to a fifth embodiment.

Moreover, the frame body of the Action 1001 has the configuration of a frame body 902 shown in FIG. 9. Specifically, the frame body 902 further includes an uplink start offset field and uplink duration field in addition to the configuration of the frame body 901. If an action frame has a frame body 902, an uplink traffic transmission timing is further set. The wireless communication apparatus 401 can transmit a frame (data 1020 in FIG. 11) after an uplink start offset elapses after receiving Action 1001. In this case, the wireless communication apparatus 402 waits until time T_do prescribed in the uplink start offset field from time (T_rx) elapses after Action 1001 is transmitted.

Reception processing of the wireless communication apparatus 401 after time T_do elapses is the same as reception processing after time T_s elapses in the first embodiment; therefore, the explanation is omitted.

The wireless communication apparatus of the fifth embodiment can obtain the same effect as the wireless communication apparatus of the first embodiment.

Sixth Embodiment

The first to fifth embodiments relate to the case where time receiving the next frame after a frame transmission/reception event occurs is generated for SIFS or specified time.

The sixth embodiment relates to a reception processing method in the case where the time for receiving the next frame is not determined.

According to the IEEE 802.11 wireless LAN standard, after the time SIFS (first time) elapses from the generation of a frame transmission/reception event, it is prescribed that a frame is transmitted divided by a time called a slot time. For example, the slot time is 9 μsec conforming to the IEEE 802.11a standard, and is 20 μsec conforming to the IEEE 802.11b standard, and further, 9 or 20 μsec conforming to the IEEE 802.11g standard.

According to the IEEE 802.11 standard, there is a need to take a back-off procedure in order to obtain a right of transmitting a frame. According to the back-off procedure, for example, when time elapses by a plurality of slot times after DIFS (=SISF+2*T_sl) (T_sl: slot time) time elapses; it is judged that no wireless communication apparatus transmits a frame. In this case, the self-station can transmit a frame. In this case, the number of slot times is determined by a unique random number from 0 to n (n is an integer more than 1) in each wireless communication apparatus.

The foregoing transmission procedure is performed. Therefore, as shown in FIG. 12, the correlation between the received signal and a known Preamble pattern is obtained based on a time T_e (T_e is a value less than the slot time) (second time) for each slot time cycle after the time SIFS elapses from generation of a frame transmission/reception event. In this way, the header of data 1201 can be detected.

In this case, frame header detection for each slot time cycle is repeated N times (N is an integer more than 1). The foregoing N may be determined as n/2, for example.

Frame header detection made for the time T_e at the slot time cycle is the same as the processing procedure described in the first embodiment; therefore, the explanation is omitted.

The wireless communication apparatus of the sixth embodiment can obtain the same effect as the wireless communication apparatus of the first embodiment.

Seventh Embodiment

The frame header detection operation described in the first to sixth embodiments may be set so that it is always carried out in wireless communication. For example, if a specified condition is established, the detection operation may be used so that the frame header detection operation is valid.

For example, the foregoing specified condition is used in the following cases. One is the case where a packet error rate (PER) of a received frame exceeds 50%. Another is the case where a demodulator starts a reception processing, but the probability of not detecting a PHT header exceeds 50%. Another is the case where the probability of retransmitting a frame transmitted by the self-station exceeds 60%. Another is the case where a bit rate is less than a preset MAC throughput value (e.g., 10 Mbps). If the foregoing conditions are not established, the wireless communication apparatus operates in the normal wait operation mode.

FIG. 13 shows the configuration of a wireless communication apparatus to realize the seventh embodiment. A wireless communication apparatus 200 shown in FIG. 13 differs from that shown in FIG. 2 in that a statistic information unit 209 is additionally provided. The statistic information unit 209 collects a packet error rate (PER) of a received frame, or the probability of retransmitting a frame transmitted by the self-station or MAC throughput value information.

For example, if the statistic information unit 209 collects a PER, it receives notification that a frame is received and the received frame has an FCS error, from the transmission/reception frame processor 205. Based on this information, the statistic information unit 209 calculates a PER, and then, compares the calculated PER with a preset reference value (e.g., 50%). If the PER exceeds the reference value, the statistic information unit 209 supplies instructions to execute a signal arrival judgment operation, to the transmission/reception frame processor 205.

According to the seventh embodiment, the statistic information unit 209 supplies instructions to execute a signal arrival judgment operation, to the transmission/reception frame processor 205. Thereafter, the same operation as the wireless communication apparatus of the first embodiment is carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a signal arrival judgment unit configured to wait until a first time elapses after a MAC frame is transmitted or received, configured to start a signal detection by performing a correlation between a received signal and a known preamble pattern after the first time elapses, and configured to judge whether or not a reception signal is a desired signal after a second time elapses after the first time elapses;
a statistic information unit configured to collect statistic information, including a packet error rate, and to compare the statistic information to a predetermined reference value to validate a judgment by the signal arrival judgment unit;
a demodulator configured to receive the judgment result by the signal arrival judgment unit, and configured to start to demodulate the reception signal after the signal arrival judgment unit judges that the reception signal arrives is the desired signal; and
a transmission and reception frame processor configured to analyze a demodulated MAC frame based on the reception signal.

2. The apparatus according to claim 1, wherein:
the transmission and reception frame processor generates a MAC frame to be transmitted and analyzes the MAC frame, and analyzes a received MAC frame,
the apparatus further comprises a wireless unit configured to transmit the MAC frame generated by the transmission and reception frame processor to a wireless medium as a wireless signal, and configured to receive a wireless signal, and
the signal arrival judgment unit starts operation of waiting until the first time elapses after the wireless signal is transmitted from the wireless unit or after the received MAC frame is analyzed by the transmission and reception frame processor.

3. The apparatus according to claim 2, wherein the signal arrival judgment unit includes:
a preamble analyzer configured to analyze whether or not a desired preamble pattern exists in the reception signal received by the wireless unit; and
a controller configured to supply instructions to start an operation to the preamble analyzer after the transmission and reception frame processor obtains the analysis result of the MAC frame, and configured to supply instructions to start a demodulation operation to the demodulator after the desired preamble pattern is detected after the preamble analyzer starts to operate.

4. The apparatus according to claim 1, wherein the first time corresponds to a short interframe space (SIFS) conforming to the IEEE 802.11 standard including at least one of IEEE 802.11a, IEEE 802.11b, IEEE 802.11g and IEEE 802.11n.

5. The apparatus according to claim 2, wherein the first time is determined based on frame transmission notice time information included in the MAC frame analyzed by the transmission and reception frame processor.

6. The apparatus according to claim 5, wherein the frame transmission notice time information is an uplink start offset included in a frame body of the MAC frame.

7. The apparatus according to claim 5, wherein the frame transmission notice time information is a downlink start offset included in a frame body of the MAC frame.

8. The apparatus according to claim 1, wherein the statistic information collected by the statistic information unit is any of a packet error rate of a received MAC frame, a frame retransmission probability when a MAC frame is transmitted and a throughput value of a MAC frame.

9. A wireless communication apparatus comprising:
a signal arrival judgment unit configured to wait until a first time elapses after a MAC frame is transmitted or received, configured to start a signal detection by performing a correlation between a received signal and a known preamble pattern after the first time elapses, and configured to judge whether or not a reception signal is a desired signal for N time cycles (N is an integer number more than 1) after the first time elapses;

a statistic information unit configured to collect statistic information, including a packet error rate, and to compare the statistic information to a predetermined reference value to validate a judgment by the signal arrival judgment unit;

a demodulator configured to receive the judgment result by the signal arrival judgment unit, and configured to start to demodulate the reception signal after the signal arrival judgment unit judges that the reception signal is the desired signal; and a transmission and reception frame processor configured to analyze a demodulated MAC frame based on the reception signal.

10. The apparatus according to claim 9, wherein:

the transmission and reception frame processor generates a MAC frame to be transmitted and analyzes the MAC frame, and analyzes a received MAC frame, the apparatus further comprises a wireless unit configured to transmit the MAC frame generated by the transmission and reception frame processor to a wireless medium as a wireless signal, and configured to receive a wireless signal, and the signal arrival judgment unit starts operation of waiting until the first time elapses after the wireless signal is transmitted from the wireless unit or after the received MAC frame is analyzed by the transmission and reception frame processor.

11. The apparatus according to claim 10, wherein the signal arrival judgment unit includes:

a preamble analyzer configured to analyze whether or not a desired preamble pattern exists in the reception signal received by the wireless unit; and a controller configured to supply instructions to start an operation to the preamble analyzer after the transmission and reception frame processor obtains the analysis result of the MAC frame, and configured to supply instructions to start a demodulation operation to the demodulator after the desired preamble pattern is detected after the preamble analyzer starts to operate.

12. The apparatus according to claim 10, wherein the first time corresponds to a short interframe space (SIFS) conforming to the IEEE 802.11 standard including at least one of IEEE 802.11a, IEEE 802.11b, IEEE 802.11g and IEEE 802.11n.

13. A wireless communication method comprising:

transmitting or receiving a MAC frame;

waiting until a first time elapses after the MAC frame is transmitted or received;

starting a signal detection by performing a correlation between a received signal and a known preamble pattern after the first time elapses;

judging whether or not a reception signal is a desired signal after a second time elapses after the first time elapses;

collecting statistic information, including a packet error rate;

comparing the statistic information to a predetermined reference value to validate a judgment that the reception signal is the desired signal; and starting a demodulation operation of the reception signal after it is judged that the reception signal is the desired signal.

14. The method according to claim 13, wherein whether or not a desired preamble pattern exists in the reception signal is analyzed to judge whether or not the desired reception signal arrives.

15. The method according to claim 13, wherein the first time corresponds to a short interframe space (SIFS) conforming to the IEEE 802.11 standard including at least one of IEEE 802.11a, IEEE 802.11b, IEEE 802.11g and IEEE 802.11n.

16. The method according to claim 13, wherein the first time is determined based on frame transmission notice time information included in the transmitted or received MAC frame.

17. The method according to claim 16, wherein the frame transmission notice time information is an uplink start offset included in a frame body of the MAC frame.

18. The method according to claim 16, wherein the frame transmission notice time information is a downlink start offset included in a frame body of the MAC frame.

19. The method according to claim 13, wherein the judging includes judging whether or not the reception signal is the desired signal for N time cycles (N is an integer more than 1) after the first time elapses.

* * * * *